United States Patent [19]

Pelletier

[11] 4,011,125
[45] Mar. 8, 1977

[54] TIRE RETREADING

[75] Inventor: Guy Pelletier, Melbourne, Canada

[73] Assignee: Bombardier Limited, Canada

[22] Filed: May 31, 1974

[21] Appl. No.: 475,309

[52] U.S. Cl. .................................. 156/394; 156/96
[51] Int. Cl.² ...................................... B29H 5/04
[58] Field of Search ............ 156/96, 128, 129, 130, 156/394 FM

[56] References Cited

UNITED STATES PATENTS

| 2,489,643 | 11/1949 | Hunter | 156/394 FM |
|---|---|---|---|
| 2,766,006 | 10/1956 | Kraft | 156/394 FM |
| 2,989,779 | 6/1961 | White | 156/96 |
| 3,118,181 | 1/1964 | Cork | 156/96 |
| 3,236,709 | 2/1966 | Carver | 156/96 |
| 3,325,326 | 6/1967 | Schelkmann | 156/96 |
| 3,745,084 | 7/1973 | Schelkmann | 156/394 FM |
| 3,779,832 | 12/1973 | Reppel | 156/394 FM |
| 3,802,977 | 4/1974 | Wasko | 156/394 FM |
| 3,846,201 | 11/1974 | Huskins | 156/129 |
| 3,847,695 | 11/1974 | Gross | 156/96 |
| 3,883,382 | 5/1975 | Pelletier | 156/96 |
| 3,935,045 | 10/1973 | Wolfe | 156/96 |

FOREIGN PATENTS OR APPLICATIONS

| 555,727 | 9/1943 | United Kingdom | 156/96 |

OTHER PUBLICATIONS

Brochure—The James C. Heintz Co., 3738 W. 143rd St. Cleveland Ohio 44111 bearing date 1-73 and covering letter stating it was published Sept. 1, 1972 as in single sheet and that brochure (including Figure 4) as 1-10-73.

Primary Examiner—Charles E. Van Horn
Assistant Examiner—John E. Kittle
Attorney, Agent, or Firm—Fetherstonhaugh & Company

[57] ABSTRACT

An apparatus and a process for cold cure retreading of worn tires using a fully pre-cured tread band bonded in place on said tire by means of a layer of cushion gum. In order to cure the layer of cushion, gum, steam is supplied to a rubber tube disposed within the tire which itself is mounted on a suitable rim assembly, and steam at a lesser pressure is supplied to an annular steam chamber whose inner wall is constituted by a steam impervious flexible bladder that circumscribes the crown portion of the tire assembly. Cone elements are disposed on either side of the tire assembly to support the bladder and prevent excessive bulging thereof beyond the crown portion of the tire.

6 Claims, 6 Drawing Figures

TIRE RETREADING

This invention relates to process and apparatus for cold cure retreading worn pneumatic tires with fully pre-cured tread bands which are bonded to the tread surfaces of the tires by means of cushion gum. Vulcanization of the layer of cushion gum is effected by means of heat and pressure applied across the layer of cushion gum.

Such a process and apparatus designed to carry out the process are disclosed in Canadian Patent No. 905,273 issued July 18, 1972 for an invention by Guy Pelletier, entitled "Method and Apparatuses for Retreading Worn Tires".

The present invention constitutes an improvement over subject matter disclosed and defined in the above noted Canadian Patent due to the use of a circumscribing bladder made of relatively flexible steam impervious rubber-like material that is allowed to bear directly over the replacement tread band and over a short distance beyond the tread band on the sides of the tire being retreaded, and the bladder is supported by means of cone members disposed on either sides of the tire assembly. With this arrangement the bladder completely covers the crown portion of the tire including the region where the side edges of the tread band meet the side walls of the tire. This is being found to result in better bonding of the tread band across the entire width thereof, and in particular in better bonding of the edges of the tread band along the edges of the buffed surface of the tire. The appearance of the retreaded tire is considerably improved due to the substantially complete elimination of excess rubber along the sides of the junction, and it has been found that this arrangement practically eliminates the problem of displacement of the tread band relative to the tire during vulcanization of the cushion gum.

The process and apparatus in accordance with this invention can also permit retreading of tires of different nominal sizes with the same cage assembly with the result that fewer components are required for retreaders wishing to retread truck tires of all sizes or a complete line of automobile and truck tires.

In practice, the pressure of the steam supplied to the rubber tube within the tire can be limited to about 80 pounds per square inch while a pressure of the order of 35 pounds per square inch within the annular steam chamber is sufficient for excellent bonding without any significant deterioration of the structure of the worn tire.

This invention therefore, provides a process for retreading a worn pneumatic tire with a fully pre-cured tread band disposed over the worn surface of the tire with a layer of cushion gum therebetween comprising the steps of buffing the worn tread surface of said tire, applying a coating of rubber cement over the buffed surface, placing a fully pre-cured tread band around the buffed surface of said tire with a layer of cushion gum between said buffed surface and the inner surface of said tread band, mounting a steam impervious rubber tube within the tire, mounting the tire to a suitable rim assembly which prevents outward displacement of the beads of the tire, placing the tire within the confines of an annular steam chamber whose inner wall consists of a flexible bladder of rubber-like material, stretching the bladder around the crown portion of the tire by means of steam, permitting inward bulging of the bladder to contact the side walls of the tire over the same distance from the center of the tire, supplying steam to the inner tube, controlling the steam pressures to maintain a slight overpressure from the inside of the tire across the layer of cushion gum sufficient to prevent inward buckling of the tire. The overpressure may be of the order of 3 psi. The steam pressure inside the annular chamber may be about 35 psi, preferably 34 psi while the steam pressure within the inner tube should be maintained at around 80 psi, preferably at 78 psi. With such pressures, a truck tire is fully cured within one hour.

This invention also provides a retreading apparatus for bonding a pre-cured tread band to the buffed surface of a worn tire, comprising a rim assembly for the tire, an inner tube assembly disposed inside the tire and including a steam supply and drain assembly, a cage assembly for receiving the tire assembly and for defining an annular steam rubber circumscribing the tire assembly and including a steam supply and drain assembly. The cage assembly is disposed within a suitable housing and steam control means are provided for each supply and drain assembly. The cage assembly combines two cone members and means for retaining the cone members on either sides of the tire assembly for centering the tire assembly and the cone members on a common axis and for preventing outward displacement of one cone member relative to the other during the cushion gum curing process. The peripheral edge of lesser diameter of each cone member contacts the corresponding side of the tire assembly while a main ring assembly is provided which circumscribes the cone members and supports a steam impervious bladder that defines an annular steam chamber.

An exemplary embodiment of this invention will now be described in detail in association with the accompanying drawings of which the Figures are as follows.

Figure 1:
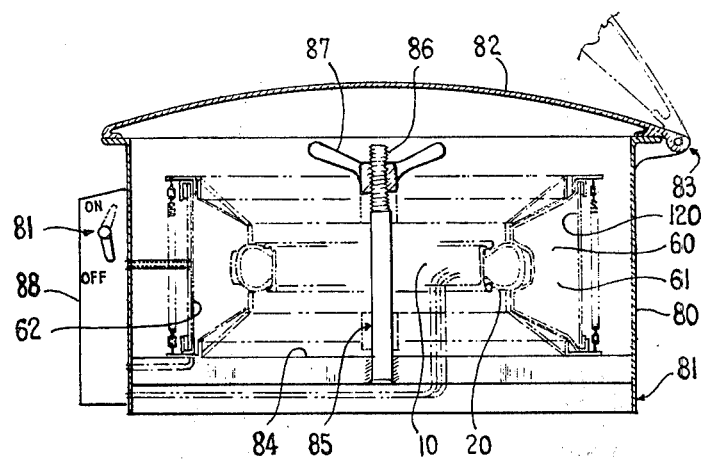
FIG. 1 is a side elevation cross-sectional view illustrating an apparatus for cold cure retreading tires.

With particular reference to the six (6) FIGS. of drawings, wherein the same reference numeral always refers to the same component, an improved apparatus for retreading worn tires with pre-cured tread bands is shown which combines a rim assembly 10 mounted centrally of worn tire 20 and having a fixed flange 12 and a removable flange 14 for retaining the beads of tire 20. An inner tube assembly 30 is mounted inside tire 20 and includes a steam impervious rubber tube 32 and a first steam supply and drain assembly 34 which projects inside rubber tube 32, and which can slide in and out of a groove in the cylindrical wall of rim assembly 10.

A cage assembly 40 receives therein the tire assembly which consists of rim assembly 10, inner tube assembly 30 and worn tire 20 to which it has already been applied a pre-cured tread band 50 and a layer of cushion gum 52 between the tread band and the buffed surface of worn tire 20. Cage assembly 40 defines an annular steam chamber 60 which circumscribes the tire assembly; and a second steam supply and drain assembly 70 communicates with the inside of annular steam chamber 60. It should be noted that in each of the FIGS. 1 and 2, annular steam chamber 60 is shown in the pressurized, operative condition on one side as at 61 and is shown in the neutral, fully collapsed condition on the opposite side of these Figures as at 62.

Figure 3:
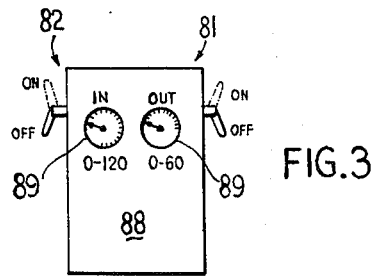
FIG. 3 is a front view of a control panel seen from the side in the left-hand side of FIG. 1.

Cage assembly 40 is mounted inside housing 80 which provides first and second steam control means 81, 82 as shown in FIG. 3, each steam supply being associated with the corresponding one of the above noted steam supply and drain assemblies 34 and 70.

Cage assembly 40 combines a first cone member 91 and a second cone member 101 each cone member having an inner peripheral edge 92 and 102 of relatively small diameter adapted to contact the corresponding side surface of tire 20.

Peripheral edges 92, 102 of cone members 91, 101 must have the same diameter and they are adapted to suit tires which are sufficiently large for their side surfaces to contact edges 92, 102 but not so large as to require a rim assembly 10 whose flanges 12, 14 would interfere with cone edges 92, 102. Hence a particular set of cone members 91, 101 can be used for retreading more than one tire size.

Figure 6:
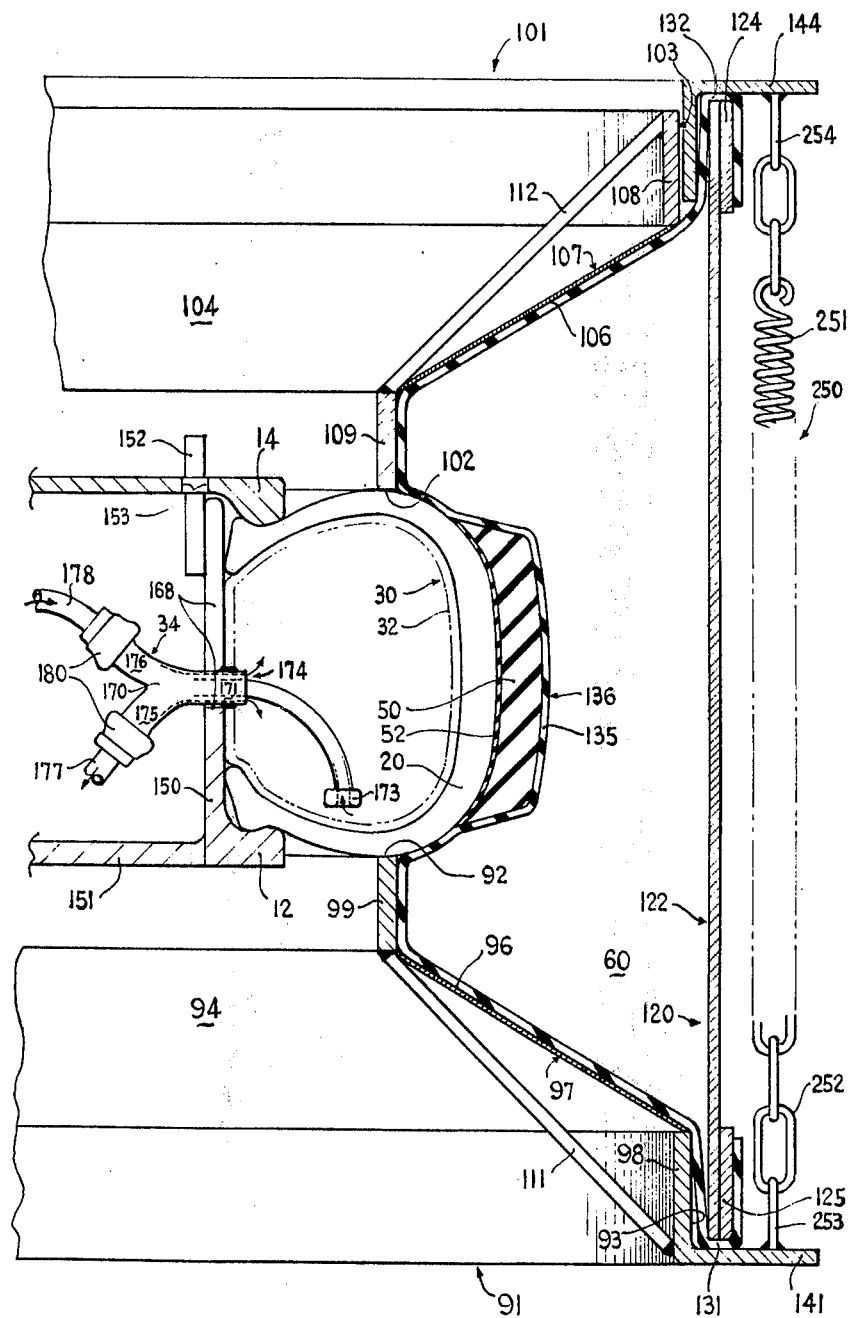
FIg. 6 is an enlarged cross-sectional view illustrating in detail the left-hand side of the cage assembly of FIG. 2.

Cage assembly 40 also comprises a main ring assembly 120 which circumscribes the outer peripheral edges 93, 103 of cone members 91, 101 and which retains in steam sealing engagement the edges 131, 132 of bladder 135 as best seen in FIG. 6. Bladder 135 consists of an endless belt of heat-resistant, flexible rubber or rubber-like material whose outward surface 136 cooperates with the inward surface 122 of main ring assembly 120 to define the above noted annular steam chamber 60. Main ring assembly 120 consists of a wide cylindrical wall 123 of steel or like rigid material, and auxiliary rings 124, 125 welded or otherwise secured to the opposite edges of cylindrical wall 123. They reinforce cylindrical wall 123 and provide wider edges over which to fold edges 131, 132 of bladder 135.

In the illustrated embodiment, housing 80 as seen in FIG. 1 comprises a cylindrical wall 81, a safety closure or lid 82 hinged as at 83 to one side of the upper edge of wall 81 for giving access to cage assembly 40 between successive retreading operations, a base 84 and a vertically extending shaft 85 secured to base 84 generally centrally thereof. The upper end of shaft 85 is threaded as at 86 in order to receive a wing nut 87. The threaded portion 86 should be of the order of 5 to 10 inches long so as to accommodate for tires of different nominal widths. A control panel 88 is supported to one side of housing 80 and combines steam control means 81 and 82 which include steam pressure gauges 89 for the pressure within inner tube assembly 30 and for the pressure within annular steam chamber 60. Separate steam controls and gauges are used since the steam pressures are different, being typically 34 psi within chamber 60 and 78 psi with tube 32.

As best shown in FIGS. 1 and 6, lower cone member 91 bears against base 84 with its central hub engaging shaft 85. The hub of each cone member 91, 101 consists of radial ribs 94, 104 leading to a central sleeve or bushing 95, 105 which receives shaft 85 in sliding engagement. Between each outer peripheral edge 93, 103 and the associated inner edge 92, 102, each cone member has a generally conical surface 96, 106 for supporting bladder 135 and thus preventing excessive bulging thereof. Each conical surface 96, 106 is defined by a generally thin-walled truncated element 97, 107 with comparatively thick, reinforcing cylindrical ring elements 98 and 99, 108 and 109 respectively. The mating edges of these elements in each cone member are welded together and the edges are suitably buffed so as to remove all sharp ridges and edges that could damage bladder 135 when inflated with steam. The cone member structures are further strengthened by means of plates 111 and 112 welded between the larger ring element 98, 108 of each cone member 91, 101, and the corresponding smaller ring element 99, 109; there being one such plate 111 and 112 for each radial rib 94, 104. Each rib 94, 104 of which four or six may be provided in each cone member 91, 101 has its respective outer end portion welded to the associated plate 111, 112.

Cage assembly 40 also includes means for maintaining edges 131 and 132 of bladder 135 in steam sealing engagement with the edges of main ring assembly 120. With particular reference to FIG. 6, lower cone member 91 is provided with an outwardly extending flange 141 sufficiently wide to support main ring assembly 120 on its lower edge. The lower edge portion 131 of bladder 135 is received between flange 141 and main ring assembly 120. In the illustrated embodiment, ring element 98 and flange 141 of lower cone member 91 are constituted by an angle iron bent into a circular angle ring and welded to the other parts of cone member 91. At the upper edge of main ring assembly 120 there is provided an other angle ring 143 bent into a circle, and having an outwardly projecting flange 144 which bears against the folded edge 132 of bladder 135. A plurality of vertical tensioners 250 equally spaced around main ring assembly 120 interconnect flanges 141 and 144 together with sufficient force to seal the edges of annular steam chamber 60 against loss of steam between the marginal edge portions of bladder 135 and ring assembly 120. Vertical tensioners 250 each comprises a coil spring 251 a suitable link, for example a chain 252, and lugs 253 and 254 welded or otherwise secured to flanges 141, 144. The tension force created by springs 251 should be evenly distributed around ring assembly 120; consequently, a large number of relatively small springs 251 should be preferable to few strong springs. In a satisfactory configuration the springs 251 are evenly spaced six inches apart around the periphery of main ring assembly 120, and each spring had provides a tension of about 300 pounds. Such relatively small springs can be easily removed for changing a damaged bladder 135. However, this arrangement is also used as a safety steam release whereby beyond about 40 psi, steam is allowed to escape between bladder 135 and main ring assembly 120. Hence springs 251 and the lengths of chains 252 should be calibrated to obtain just enough sealing force around ring assembly 120.

The gap between angle ring 143 and surface 103 of the upper cone member 101 should be as small as possible, for example 1/8 inch, in order to prevent bulging of bladder 135 thereinto.

Bladder 135 consists of an endless belt of rubber that can withstand repeated changes in temperature without loosing its flexibility and its stretchability. It should be of course be impervious to steam and be sufficiently strong to resist tearing especially at its edges 131, 132 when pressure is applied to annular steam chamber 60.

The width of bladder 135 should exceed the height of main ring assembly 120 so as to fold over and behind the edges thereof. The diameter of bladder 135 should be slightly less than that of cylindrical wall 123, for example one inch less. The use of bromo-butyl rubber about ¼ of an inch thick and stretchable 600% can provide satisfactory results for over 300 retreading operations. It is important however, that the thickness of the bladder be uniform over its entire circumference so as to ensure uniform pressure over the tire crown during curing.

Figure 2:
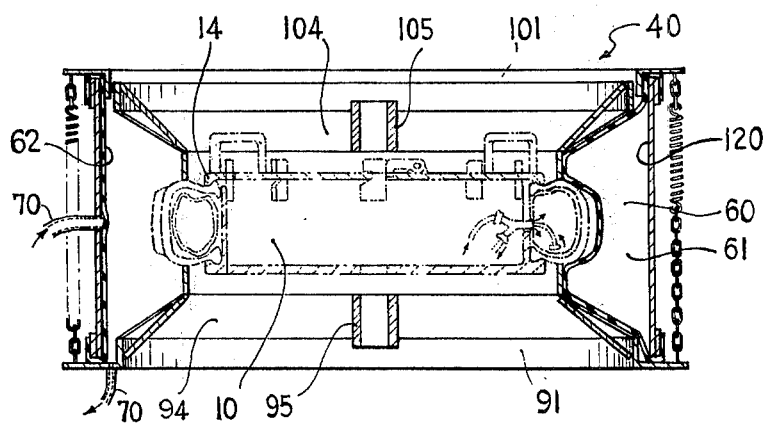
FIG. 2 is a side elevation cross-sectional view of the cage assembly of the apparatus illustrated in the FIG. 1.
Figure 4:
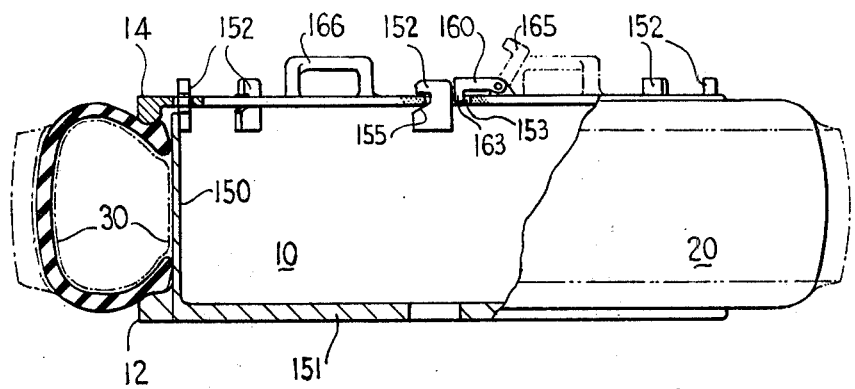
FIG. 4 is a side view of a tire assembly with a rim assembly partly broken away.
Figure 5:
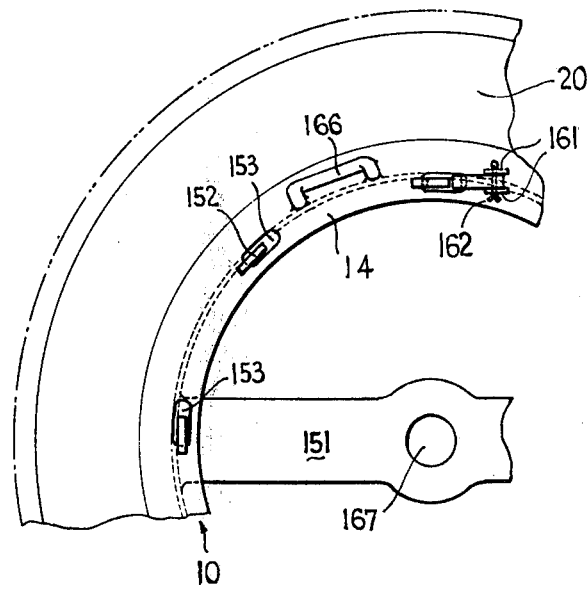
FIG. 5 is a partial top view of the tire assembly shown in FIG. 4.

Rim assembly 10 as best illustrated in FIGS. 2 and 6 combines cylindrical wall 150, fixed flange 12, removable flange 14, a locating member 151 and a bayonet type of connection for holding removable flange 14 in place on cylindrical wall 150. The connection (see also FIG. 4) consists of a series of lugs 152 welded or otherwise secured to the inside of cylindrical wall 150 and equidistant locations thereof, and of a series of corresponding slots 153 for receiving lugs 152. Each lug is notched or undercut as at 155 so that once the lugs 152 are received in slots 153, removable flange 14 can be turned a few degrees in the direction of notches 155 and thus prevented from axial displacement relative to cylindrical wall 150. A pivoted locking finger 160 connected to removable ring 14 by means of lugs 161 and pin 162, and provided with a nose portion 163 will prevent unwanted relative rotation of removable flange 14 when lowered in the position shown in FIG. 4 in full lines. Phantom lines 165 represent locking finger 160 in the released position. Although a plurality of notched lugs 152 should be provided, only one locking finger 160 is necessary. Handles 166 on removable flange 14 are used to lift same from cylindrical wall 150 for removing tire 20 and inner tube assembly 30 from rim assembly 10. They are also used for handling a tire assembly being lowered into or taken out of cage assembly 40.

Locating member 151 secured to rim assembly 10 is provided with an aperture 167 at the exact center of rim assembly 10; it is designed to slidingly fit over shaft 85 thus to center the tire assembly with cone members 91, 101. An axial slot 168 in wall 150 opening toward the free end thereof permits the insertion of the stem of steam supply and drain assembly 34.

Inner tube assembly 30 combines a rubber tube 32 and a suitable steam supply and drain assembly 34. Rubber tube 32 should be steam impervious and comparatively resistant to repeated steam injection cycles. Its wall thickness may be of the order of ⅛ in. and use a rubber composition generally similar to that utilized in the making of bladder 135. Tube 32 should be strengthened in the region where assembly 34 is connected to the rubber tube. Steam supply and drain assembly 34 comprises a Y-connector 170 having a coaxial stem 171 that terminates as an inner flexible drain pipe 172 weighted at its free end as at 173 for suction of steam condensate, and as an outer steam nozzle 174. The arms 175, 176 of connector 170 respectively lead to water pump flexible tube 177 and to steam supply flexible tube 178. Quick disconnect fittings 180 should be used for coupling tubes 177 and 178 to Y-connector 170 because tubes 177 and 178 must be physically disconnected from the tire assembly before the latter can be dismantled for withdrawal of the retreaded tire.

It is essential that the amount of steam condensate within the inner tube 32 be limited to the strict minimum and to this effect the entire housing 80 is installed on the floor with its rear edge slightly lifted off the floor. Thus, the condensate will accumulate toward the front of the inner tube 32 where drain pipe 172 rests. This forward tilting will also ensure that in the event of a loss of steam within housing 80, steam will tend to escape from the rear of housing 80 away from the operator.

The process in accordance with this invention consists of bonding a pre-cured replacement tread in position on the periphery of a worn tire after it has been suitably buffed in accordance with known techniques. The buffing should be carried out in a direction transverse to the periphery of the tire so as to facilitate the escape of air that might tend to remain entrapped between the replacement tread band and tire.

The bonding is obtained by vulcanization of a layer of cushion gum which essentially consists of uncured rubber with suitable chemicals that permit self-vulcanization under relatively low heat and pressure.

Once the tire has been buffed, it is coated with a rubber cement whose function is to dissolve small rubber particules and enhance the quality of the bond obtained after retreading. The replacement tread band which is preferably a length of tread material pre-cured under high pressure cut to fit exactly around the circumference of the tire might be replaced by endless tread bands if such are available. Normally, at the point of manufacture of the replacement treads a layer of cushion gum is immediately applied to the inner surface of the band which has been coated with rubber cement, and the free surface of the layer of cushion gum is covered with a plastic film which will prevent contamination by dirt and by air. Hence, the layer of cushion gum which remains fixed to the inner surface of the replacement tread band will remain in uncured condition during storage until the time has come to apply same to the tire.

Once the buffed tire has been coated with rubber cement, the plastic film is removed from a pre-cured tread band which is then carefully applied to the periphery of the tire. The tire is then provided with inner tube assembly 30 and then mounted to rim assembly 150. This tire assembly is then mounted inside cage assembly 40 illustrated in FIG. 2 which cage is installed within housing 80 seen in FIG. 1. Shaft 85 passes through aperture 167 of locating plate 151 of rim assembly 150, and the lower side wall of the tire comes to rest against the upper edge 92 of cone member 91. The operator then couples flexible pipes 177 and 178 to Y-connector 170. He then places upper cone member 101 over shaft 85 and returns same in place by means of wing nut 87. Having lowered protective cover 85, he can then permit the supply of steam within tube assembly 30 and annular chamber 60 by manipulation of controls 81 and 82. The steam circuit incorporates suitable pressure relief valves which will prevent overpressure from building up within the cage assembly 40, and the steam supply circuit incorporates a pressure regulator limiting the supply of steam to the preselected steam pressures. These elements which are currently used in steam feeding networks have not been illustrated.

The arrival of steam within annular steam chamber 60 causes bladder 135 which is best seen in FIG. 6 to immediately move away from main rim assembly 120 and covers the crown portion of the tire being retreaded. The bladder 135 will closely follow the walls defined by cone members 91 and 101, which walls prevent excessive bulging of the bladder and support same. Steam supplied inside rubber tube 32 should be at a sufficiently high pressure to prevent inward buckling of the tire under the action of the steam within chamber 60.

One of the main features of this invention comes from the fact that with the above described arrangement, the steam pressure within annular chamber 60 will cause bladder 135 to stretch considerably and in so doing increase the pressure which is effectively applied radially inwardly to the outward surface of replacement tread band 50. However, stretching of bladder 135 causes no significant change in pressure at the side walls of the tire. The result, therefore, is that when the pressure within annular chamber is maintained at 34 psi, the effective pressure applied radially inwardly on the entire surface of tread band 50 will be of the order of 75 psi while the pressure applied against the sides of the tire will remain at around 34 psi. With the steam pressure within inner tube 32 at 78 psi, there will remain a slight outwardly directed overpressure of about 3 psi which is sufficient to prevent inward buckling or collapse of tire 20.

The increased radial pressure exerted on either sides of the bond will force the air out of the surface of contact between tread band 50 and tire 20 and the escape of air will be enhanced by the fact that the side wall pressures are sufficiently less being about 50 to 60% of the effective pressure across the bond.

The effective pressure across the bond will of course depend upon the resistance to stretching of bladder 135 but the abovenoted figures were readily obtained with the use of the particular bladder hereinabove described.

The presence of steam on either side of the bond, i.e. the layer of cushion gum 52, will cause progressive increase of the temperature of the rubber from inside the tire and from outside the tread band 50, with the result that with the above-noted steam pressures of 34 psi within chamber 60 and 78 psi within tube assembly 30, the layer of cushion will be substantially completely vulcanized within about one hour in the case of all normal truck tire sizes.

Another main feature of the process in accordance with this invention is that due to the high pressure within tube assembly 30, the retreading operation can also be used to cure any amount of uncured rubber that might have been applied to the inside surface of the tire for the purpose of repairing defects. Indeed, since such uncured rubber will be more quickly heated because of the shorter distance from the inside of the tube assembly relative to the layer of cushion gum, the time required for proper bonding of the layer of cushion gum will necessarily be sufficient for total curing of all such masses of repair rubber. It is also advantageous to use steam at higher pressure inside the tire compared to that ouside the replacement tread band because less heat will be applied to the tread band resulting in less overheating of the ground engaging surface of the replacement tread band 50. In prior methods of cold cured retreading where considerable amounts of heat are applied only from the outside of the tire, it was in fact determined that the outer surface of the replacement tread band could wear more rapidly than the rest thereof because of slight deterioration of the rubber structure to a depth of from 1/32 inch to ⅛ inch along the entire periphery of the tread band.

As noted above, the steam pressures should be selected so as to obtain near equilibrium of the pressures across the layer of cushion gum with, however, a slight increase in pressure acting radially outwardly to prevent buckling of the tire. Pressures of the order of 35 psi within chamber 60 and 80 psi within inner tube 32, were found to produce excellent results for most truck tire sizes with a curing time of amount one hour and with equipment that can be easily built to insure adequate safety to the retreading apparatus operators. In practice a pressure within annular chamber 60 of less than 25 psi would be about the lower practical limit below which complete curing of the layer of cushion gum with minimum air entrapment and enough pressure across the bond will be difficult to achieve. However, with suitably strong components, the pressures could be increased thus reducing the curing time and eventually reaching the maximum pressure that the tire structure can withstand. Truck tires normally can withstand a maximum pressure of about 120 psi. However, it is important to insure that the pressure within annular chamber 60 will be compatible with that within inner tube 32 so as to prevent buckling of the tire and permit maximum pressure across the layer of cushion gum.

I claim:

1. Apparatus for retreading a worn pneumatic tire with a fully pre-cured tread band to be bonded to the tread surface of said tire by means of a layer of cushion gum, said apparatus comprising a rim assembly for mounting centrally of said tire and having first and second flange means for preventing outward displacement of the beads of said tire, an inner tube assembly disposed within said tire and including a steam impervious rubber tube and a first steam supply and drain assembly attached to said rubber tube and projecting inside said rubber tube, a cage assembly for receiving therein the tire assembly, which consists of said rim assembly with said inner tube assembly and said tire in position thereon, and for defining an annular steam chamber circumscribing said tire assembly, a second steam supply and drain assembly in communication with the inside of said annular steam chamber, a housing for said cage assembly, and first and second steam control means respectively for said first and second steam supply and drain assemblies, characterized in that said cage assembly consists of a first and second cone member, means for retaining said cone members on either sides of said tire for centering said cone members and said rim assembly on a common axis and for preventing outward displacement of one cone member relative to the other cone member throughout the cushion gum curing process, each cone member having an inner peripheral edge of a predetermined common diameter for contacting the corresponding side wall region of said tire radially outwardly of said rim assembly flange means but radially inwardly of said tread band, a main ring assembly for circumscribing the outer peripheral edges of said cone members, and a steam impervious bladder in sealing engagement with the opposite edges of said main ring assembly, said bladder being an endless belt made of heat-resistant, flexible rubber-like material, the inwardly facing surface of said main ring assembly and the outwardly facing surface of said bladder defining said steam chamber.

2. Apparatus as defined in claim 1 wherein said housing comprises a horizontally extending base and a vertical shaft secured to the center of said base and projecting upwardly therefrom, wherein each cone member comprises radial ribs leading to a central sleeve slidingly engaged around said shaft, and wherein a centrally apertured member of said rim assembly locates same coaxially on said shaft.

3. Apparatus as defined in claim 2 wherein said first cone member rests against said base when in position within said housing, and carries an outwardly extending flange which projects sufficiently outwardly for supporting the lower one of said main ring assembly opposite edges, said main ring assembly including an angle ring which has a radial flange, a main ring and a plurality of vertical tensioners stretched between and for resiliently interconnecting said angle ring radial flange and said first cone member outwardly extending flange; wherein the diameter of said bladder endless belt corresponds generally to the inside diameter of said main ring, wherein the width of said bladder endless belt exceeds the height of said main ring; and wherein the marginal edge portions of said bladder endless belt fold over the upper and lower peripheral edges of said main ring underneath said angle ring radial flange and over said first cone member outwardly extending flange.

4. Apparatus as defined in claim 3 wherein said angle ring comprises a cylindrical flange depending from the inner edge of said angle ring radial flange, and wherein said second cone member comprises an outer cylindrical surface loosely fitting within said cylindrical flange.

5. Apparatus as defined in claim 4, wherein said first steam supply and drain assembly comprises a Y connector, a coaxial stem extending from the leg of said Y connector, projecting through said rubber tube, and providing a steam inlet passage with a condensate return passage located coaxially and inwardly of said stem, said condensate return passage being coupled with a flexible tubing inwardly of said rubber tube and carrying a weight at its free end, one arm of said Y connector leading to a source of steam through a first quick disconnect flexible pipe, the other arm of said Y connector leading to water pumping means through a second quick disconnect flexible pipe, said rim assembly comprising an axial groove for receiving said stem.

6. Apparatus as defined in claim 5 wherein said rim assembly consists of a cylindrical wall a fixed flange extending radially outwardly from one peripheral edge of said cylindrical wall and defining said first flange means, and a removable flange assembly for removably securing to the other peripheral edge of said cylindrical wall and for defining said second flange means, said flange assembly being retained to said cylindrical wall by means of a bayonet connection consisting of axial projections on said cylindrical wall and peripheral slots through said removable flange, each axial projection being notched at its base thereby to allow rotation of said removable flange a few degrees relative to said cylindrical wall when in position thereof, and a pivotable locking finger engageable between one of said axial projections and said removable flange when thus located.

* * * * *